United States Patent [19]

Nakazono

[11] Patent Number: 4,536,412

[45] Date of Patent: Aug. 20, 1985

[54] METHOD OF PRODUCING PROTEIN-RICH FORAGE OR NITROGENOUS FERTILIZER FROM FOWL DROPPINGS, SWINE DUNG, COW DUNG AND THE LIKE

[76] Inventor: Shuzo Nakazono, 5-9-901, 2 chome Arato, Chuo-ku, Fukuoka, Japan

[21] Appl. No.: 337,123

[22] Filed: Jan. 5, 1982

[51] Int. Cl.³ ............................................. A23L 1/01
[52] U.S. Cl. ...................................... 426/641; 71/12; 71/21
[58] Field of Search ............... 426/438, 465, 472, 807, 426/641; 71/11, 12, 13, 15, 21, 22; 422/286–288

[56] References Cited

U.S. PATENT DOCUMENTS 3,261,694  7/1966  Forkner ......................... 426/438 X
3,615,724  10/1971  Sech .................................. 426/438

Primary Examiner—Ferris H. Lander
Attorney, Agent, or Firm—Brisebois & Kruger

[57] ABSTRACT

This invention relates to a method of producing protein-rich forage or nitrogenous fertilizer as a commercial product from fowl droppings, swine dung, cow dung and the like by charging said ordure into a heated animal, fish or vegetable oil, subjecting the mixture to a smooth dehydrating treatment under the two-step reduced pressure conditions starting initial by with a limited pressure reduction and later increasing the degree of pressure reduction, and thereafter squeezing oil out of the treated mixture to thereby produce said forage or fertilizer. Said method is conducive to the prevention of malodor pollution caused by said livestock excrements and can also eliminate the wasteful use of fuel required in the incineration treatments.

4 Claims, No Drawings

METHOD OF PRODUCING PROTEIN-RICH FORAGE OR NITROGENOUS FERTILIZER FROM FOWL DROPPINGS, SWINE DUNG, COW DUNG AND THE LIKE

BRIEF SUMMARY OF THE INVENTION

A vast amount of cost and extensive facilities have been required for the elimination of malodor generated in the course of treatment or disposal of fowl droppings, swine dung, cow dung and such, and even if the treatment could be performed without generating offensive smell, the treated ordure could find no effective way of utilization but has been merely burned or discarded.

The present invention is designed to accomplish an odorless treatment of fowl droppings and the like under the specific reduced pressure conditions by making use of a heated animal or vegetable oil and to also recycle the treated ordure as a useful protein-rich forage or nitrogenous fertilizer. The methods of treating the animal waste by utilizing an oil are already disclosed in, for example, U.S. Pat. Nos. 1,766,032, 2,875,222, 3,288,825 and 3,057,699, but the techniques shown in these patents aim to merely extract and recover oils from the animal waste and shed no light on the formulation of forgage or fertilizer from the treated animal waste.

The present invention provides a method of producing forage or fertilizer as a commercial product from fowl droppings and such by using an oil, said method featuring effective dehydration of said ordure under the two-stage reduced pressure conditions and ensuing perfect oil expression.

DETAILED DESCRIPTION OF THE INVENTION

An embodiment of the method according to this invention is described below.

About 900 kg of an oil is fed into a cooker with a capacity of approximately 6.5 m$^3$ and heated to a temperature range above 90° C. in which the gelatinous substance would not be dissolved in the oil but is thermally coagulated. Then about 3 tons of sludge-formed ordure with around 90% of water content is supplied into said cooker and heated under stirring. Then the material is subjected to two-stage reduced pressure dehydration, that is, in the first stage of about 30 minutes after feed of the material, dehydration is performed under a limited reduced pressure of 10–20 mmHg, and then in the second stage, the pressure in the cooker is further reduced to 740–750 mmHg. The material which has been dehydrated to a moisture content of about 6% by around 3 hours of said treatment is taken out of the cooker and compressed by a continuous compressor under a unit pressure of 7,000 pounds to form the oil-separated flat-shaped solids or cakes. The cakes have an oil content of about 8% and a moisture content of about 5% and can be put to use as a protein-rich forage with a protein content of about 70%.

According to the method of this invention, although gelatinous substances and proteins are contained in the sludge, the temperature of the sludge would not be lowered by pressure reduction since said sludge is kept in a state allowing free evaporation of moisture by heated oil owing to the restricted pressure reduction during the initial stage, that is, during the period of about 30 minutes after feed of the material, and thus the animal oil or the like supplied is maintained at a temperature above 90° C. that inhibits the gelatinous substances and proteins from being dissolved in the oil, and when the sludge is supplied into the oil, the gelatinous substances and proteins in the sludge are instantaneously heated and coagulated and thus prevented from being dissolved and effusing into the oil. Also, the proteins in the sludge is thermally coagulated by the heated oil while the moisture is prevented from being emulsified with the gelatinous substances and proteins owing to thermal coagulation of said substances, thus creating a situation where the moisture is apt to evaporate. Then the pressure is further reduced to render the density of moisture smaller than that of the oil to cause displacement of moisture and oil and induce separation and evaporation of moisture, thereby effecting uniform heat-dehydration as well as uniformalization of thermal efficiency. Further, carbonization of protein, calcium, etc., is prevented by the reduction of the dehydration time, keeping the dehydration rate constant at around 6%, and then the oil is separated from the soilds (cakes) through the steps of centrifugation, continuous compression, etc., to thereby obtain a high-grade forage consisting principally of water-soluble protein or a high-grade nitrogenous fertilizer.

The protein-rich forage obtained according to the method of this invention is then dehydrated into a fine powdery form, and in this case, since dehydration is performed under a limited reduced pressure condition in the initial phase of the dehydration treatment, the gelatinous substances and proteins are not dissolved and the three substances, that is, gelatinous substance, protein and water would not be entangled and integrated with each other, so that the whole material undergoes uniform dehydration in the pre-heated oil and therefore a uniform pressure can be applied in the oil separation step for powdering the mass, thus allowing obtainment of a high-grade protein-rich forage with no scattering of quality among the products.

Further, since said three substances are not entangled with each other, moisture can be removed in an uncontaminated state and hence BOD and COD of the evaporated or released water is very low and causes no pollution problem.

What is claimed is:

1. A method of producing protein-rich forage or nitrogenous fertilizer from a water containing ordure sludge of fowl droppings, swine dung, cow dung, or the like which comprises, charging a batch of said water containing ordure into a cooker containing an animal, fish or vegetable oil preheated to a temperature above 90° C. at which gelatinous substances and proteins in the ordure are not dissolved in the oil but are thermally coagulated, heating and stirring the mixture in said cooker while reducing the pressure in the cooker to a first reduced pressure of 10–20 mmHg for a period of about 30 minutes after charging to perform a first stage of dehydration and to thermally coagulate the gelatinous substances and proteins of the ordure, then further reducing the pressure in the cooker to a second reduced pressure while heating and stirring to cause the density of moisture in the mixture to become lower than the density of the oil to further remove moisture from ordure solids and the oil, then removing the thus treated material from the cooker and compressing the material to separate the oil from the solids.

2. A method according to claim 1 wherein said second reduced pressure is a reduced pressure in the range of 740–750 mmHg.

3. A method according to claim 2 wherein the second reduced pressure is maintained for a time sufficient to reduce the moisture content of the solids to not more than about 6%.

4. A method according to claim 1 wherein the second reduced pressure is maintained for a time sufficient to reduce the moisture content of the solids to not more than about 6%.

* * * * *